US006608540B1

(12) United States Patent
Hones et al.

(10) Patent No.: US 6,608,540 B1
(45) Date of Patent: Aug. 19, 2003

(54) LEVITATION DEVICE AND METHOD

(75) Inventors: Edward W. Hones, Los Alamos, NM (US); William G. Hones, Seattle, WA (US)

(73) Assignee: Creative Gifts, Inc., Seattle, WA (US)

( * ) Notice: Subject to any disclaimer, the term of this patent is extended or adjusted under 35 U.S.C. 154(b) by 0 days.

(21) Appl. No.: 08/948,248

(22) Filed: Oct. 9, 1997

Related U.S. Application Data

(63) Continuation of application No. 08/413,949, filed on Mar. 30, 1995, now abandoned, which is a continuation-in-part of application No. 08/197,845, filed on Feb. 17, 1994, now Pat. No. 5,404,062.

(51) Int. Cl.[7] ................................................ H02K 7/09
(52) U.S. Cl. ...................................... 335/90.5; 335/306
(58) Field of Search ............................... 335/285, 306; 310/90.5; 446/256–264, 129–139

(56) References Cited

U.S. PATENT DOCUMENTS

| 2,323,837 A | 7/1943 | Neal |
| 4,382,245 A | 5/1983 | Harrigan |
| 4,427,960 A | 1/1984 | Wuerfel |
| 5,019,738 A | * 5/1991 | Weilbach et al. .......... 310/90.5 |
| 5,404,062 A | * 4/1995 | Hones et al. .............. 310/90.5 |
| 5,495,221 A | * 2/1996 | Post ........................... 335/299 |

FOREIGN PATENT DOCUMENTS

FR     1595792     6/1970

OTHER PUBLICATIONS

Ad in journal Popular Science for a Magneflight instruction booklet, from article "The Hidden History of the Levitron", at www.levitron.com. 12/88.*
Levitating Magnet, Electric Spacecraft Journal, Issue 8, Oct./Nov./Dec. 1992, May 3, 1993.*
9–page typewritten document entitled "The Levitator" having a handwritten date thereon of Sep. 29, 1992.
L. Adams, "Are Permanent Magnets Superconductors???" *Magnets In Your Future*, vol. 5, No. 6, Jun. 1991, pp. 1–7.

* cited by examiner

Primary Examiner—Ramon M. Barrera
(74) Attorney, Agent, or Firm—Blank Rome LLP

(57) ABSTRACT

An improved magnetic levitation device has a first base magnet with a partially demagnetized central region over which a second dipole magnet is spun or rotated so as to levitate above the first magnet. The levitation device may be calibrated for stability and height of levitation of the second magnet by selected demagnetization of portions of the first magnet.

26 Claims, 3 Drawing Sheets

LEVITATION DEVICE AND METHOD

CROSS REFERENCE TO RELATED APPLICATION

This is a continuation of application Ser. No. 08/413,949, filed on Mar. 30, 1995, now abandoned, which is a continuation-in-part of U.S. patent application Ser. No. 08/197,845 filed Feb. 17, 1994, now U.S. Pat. No. 5,404,062.

FIELD OF THE INVENTION

The present invention relates to levitation devices and methods and more particularly to the levitation or suspension of a permanent magnet in a magnetic field produced by another magnet (either permanent or electromagnetic) using no mechanical restraints or supports.

BACKGROUND OF THE INVENTION

Magnets, both permanent magnets and electromagnets, find a wide variety of uses, both practical and as entertainment devices. The poles of magnets have been named the north pole and the south pole, the north pole being the one that points northward in the Earth's magnetic field, i.e., the magnetic north-seeking pole. It is, of course, well known that like poles, i.e., two north poles, repel one another and unlike poles, i.e., a north pole and a south pole, attract one another.

This phenomenon has been used to levitate one magnet above another and offers the possibility of substantially reduced friction. Magnetic levitation of trains, for example, is one practical application of the phenomenon. However, in such a levitation application, highly sophisticated control devices are required for controlling the magnetic fields of electromagnets to overcome the inherent instabilities of the repulsion forces of two like magnetic poles. In a simple levitation system wherein one pole of a first permanent magnet is attempted to be suspended above a like pole of a second permanent magnet, the inherent instability of such a system results in the flipping over of the first magnet so that the unlike poles attract and are brought together into a stable configuration.

A number of simple levitation systems have been devised which employ specially configured permanent magnet arrangements intended to minimize the instability associated with magnetic levitation. In U.S. Pat. No. 2,323,837 to Neal, for example, there is disclosed a magnetic system having a base magnet comprising a circular disk in which a first plurality of cylindrical magnets is disposed in a circular array about the axis of the circular disk. An upper magnet member comprises a spherical segment in which a second plurality of cylindrical magnets is disposed in a circular array of smaller diameter than the diameter of the circular array of the base magnet. The first plurality of magnets is disposed with like (north) poles and longitudinal axes directed vertically upwardly or inclined slightly toward the axis of the circular disk. The second plurality of magnets is disposed with like (north) poles and longitudinal axes directed vertically downwardly or inclined at the same inclination as the first plurality of magnets. This arrangement of the base magnet is said to produce an inverted magnetic field cone which embraces the smaller diameter magnet field of like polarity of the upper magnet and thereby is said to stabilize the levitation system.

U.S. Pat. No. 4,382,245 to Harrigan discloses another simple magnetic levitation system which utilizes a dish-shaped lower magnet to magnetically support or levitate a magnetic top spinning coaxially above the lower magnet. The dish-shaped or concave surface of the lower magnet is said to produce radially inwardly directed lines of magnetization which, together with the gyroscopic effect of rotation of the magnetic top, provide stabilization of the levitation system. The Harrigan patent discloses another embodiment in which stabilization is said to be provided by a combination of the concave lower magnet surface and a pendulum effect resulting from a non-magnetic mass supported below the lower magnet on an arm extending from the upper magnet through a central bore in the lower magnet. Other embodiments are disclosed in which the lower field is not provided by a dish-shaped magnet but is provided by a plurality of cylindrical magnets arranged similarly to the arrangement of the aforementioned Neal patent.

SUMMARY OF THE INVENTION

The present invention is directed to a magnetic levitation device and method that accomplishes stable, unrestrained levitation of one magnet above another magnet by utilizing a previously unrecognized characteristic of the magnetic field above a magnetized surface and by incorporation of a rotational motion of the levitated magnet. Although the magnetic levitation device of the present invention may have other applications not specifically described herein, it is intended to provide an educational or amusement device that may be readily manufactured at low cost and operated simply, reliably and reproducibly with minimal instruction.

In our prior copending application U.S. patent application Ser. No. 08/197,845 filed Feb. 17, 1994, now U.S. Pat. No. 5,404,062, the complete disclosure of which is incorporated herein by reference, we disclosed a magnetic levitation device and method. The levitation device comprises a uniformly magnetized flat or substantially planar magnetic base above which is caused to levitate a spinning magnetic top made of a flat ring magnet, a nonmagnetic spindle and one or more nonmagnetic weights for adjusting the mass and therefore the height of levitation of the spinning magnetic top. For a substantially uniformly magnetized base or shell it was explained in our prior application that the outer periphery of the base or shell affects the stability of a levitation system incorporating the shell. In particular, a shell having a polygonal shaped periphery has a region a few centimeters above the surface of the shell and along the diagonals thereof where the magnetic field gradients are such as to provide both lifting and centering forces on a magnetic dipole (the spinning top) in that region. It was observed that non-polygonal peripheral shapes, such as circular and elliptical shapes, of a uniformly magnetized shell did not appear to provide the aforementioned region where both lifting and centering forces exist.

As was explained in our aforementioned prior application, now U.S. Pat. No. 5,404,062, the height at which the dipole magnet levitates can be increased by weakening the magnetic field at the geometric center of a polygonal (square) shell or base magnet. Such weakening can be accomplished by cutting a hole in the center of the shell magnet or by mounting a magnetic disk of opposite polarity over the geometric center of the base magnet.

It has now been found according to the present invention, that the outer periphery of the shell or base magnet need not be polygonal in shape if the magnetic field of the base magnet is made non-uniform by partial demagnetization in a central region of the base magnet. In other words, the outer periphery of the flat base magnet can be any shape, e.g., circular, elliptical, polygonal, if the magnetic field of the base magnet is partially demagnetized or weakened to some extent at or near a central region of the base magnet, preferably at or near the geometric center of the base magnet.

The magnetic field may be weakened by cutting a central hole in the base magnet or by mounting a smaller magnet such as a disk magnet of opposite polarity in a central region of the base magnet. It is preferred, however, to weaken the magnetic field of the base magnet by applying a strong magnet field of opposite polarity, e.g., with an electromagnet or permanent magnet, to a central region of the base magnet to permanently weaken or partially demagnetize a portion of the central region.

In addition to making possible the use of a base magnet having virtually any peripheral shape, the present invention also causes the levitated spinning dipole (top) to float or levitate at a greater height than for a uniformly magnetized base.

Furthermore, it has been found that the top is more easily spun when the magnetic field of the base is weakened.

A further feature of the method of the invention is the use of controlled partial demagnetization or weakening of the magnetic field in the central region of the base magnet to "calibrate" the levitation device by making the spinning top more stable. This feature, together with the adjustment of the weight of the spinning top, can be used to achieve an easily spun top which levitates in a relatively stable position for several minutes.

Still another feature of the invention is the use of small wedges or shims to adjust the position of the magnetic field of the base magnet with respect to the local vertical. This position adjustment helps to stabilize the levitation of the spinning magnet above the base magnet.

With the foregoing and other advantages and features of the invention that will become hereinafter apparent, the nature of the invention may be more clearly understood by reference to the following detailed description of the invention, the appended claims and to the several views illustrated in the drawings.

DETAILED DESCRIPTION OF THE INVENTION

Figure 1:
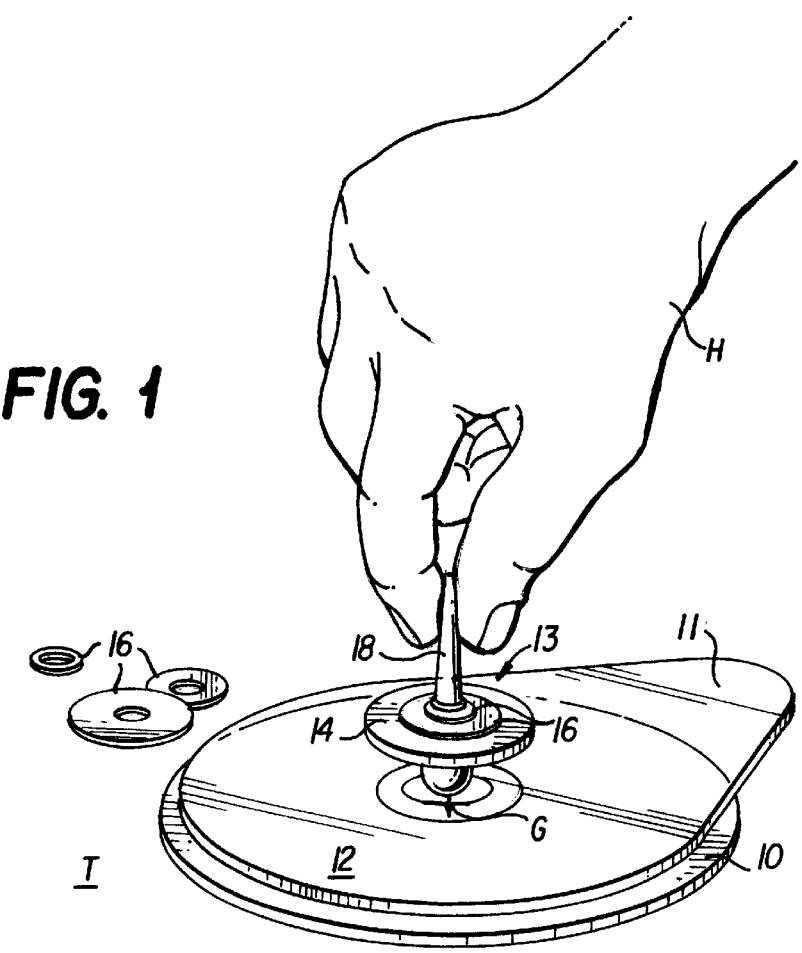
FIGS. 1–4 are a perspective views of one embodiment of the improved magnetic levitation device of the invention showing the method of operating the device of the invention.

A first embodiment of the invention is shown in FIG. 1. A first or base ceramic magnet 10 having a circular periphery of about 10 cm in diameter and a thickness of about 0.7 cm is disposed horizontally on a level surface T. Magnet 10 is magnetized normal to its large surface area with (for description purposes) its north (+) pole oriented upwardly. As described hereinafter, a central region of the magnet 10 has been demagnetized to an extent sufficient to weaken the magnetic field in that region. A non-magnetic lifter plate 12, such as a transparent plastic sheet, rests on the base magnet 10 with an edge or handle 11 extending beyond the base magnet 10. On the lifter plate 12 a top 13 is held by the hand H of a user for operation in the manner described hereinafter.

Top 13 comprises a second magnet, such as a ceramic ring magnet 14, with (for description purposes) its north (+) pole oriented downwardly toward the like north pole of the first or base magnet 10. A spindle 18, preferably made of a non-magnetic material, is fitted tightly into the central hole or ring magnet 14 for manually imparting spin to the ring magnet 14. One or more non-magnetic washers 16 are placed over the spindle 18 and fits snugly on the spindle 18 in the manner shown in FIG. 1. Washers 16 are used for weight adjustment of the magnetic top 13 as described in more detail hereinafter. Top 13 is held against the lifter plate 12 above the geometric center G of base magnet 10 and is spun, either by hand or by any appropriate mechanism, such as a cord.

Figure 2:
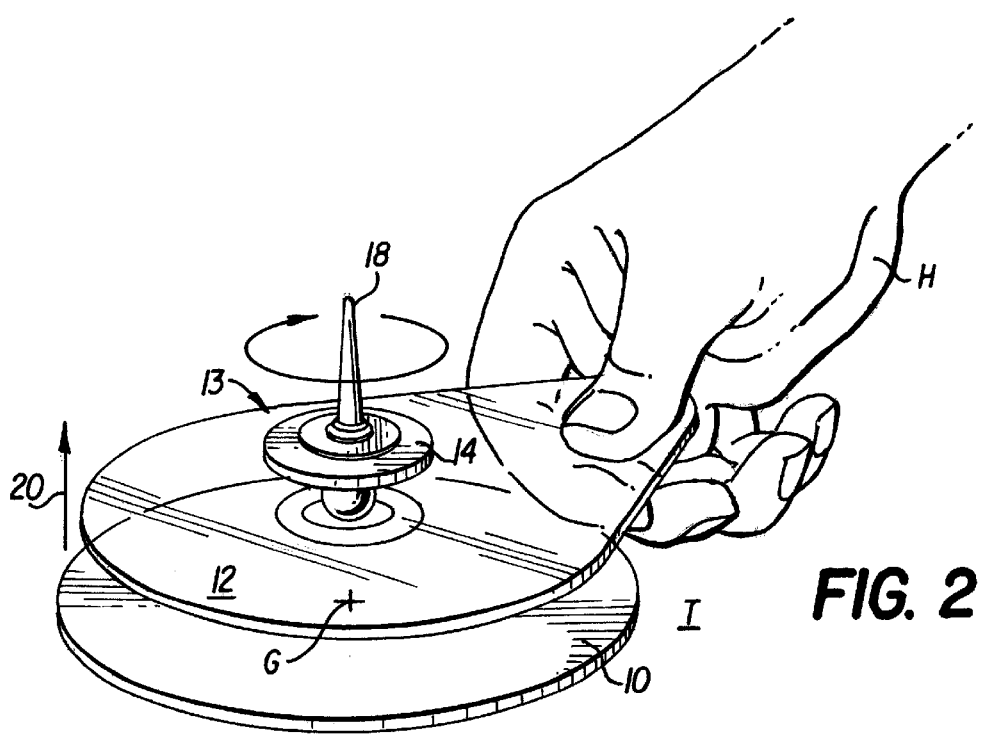

Referring now to FIG. 2 which shows top 13 spinning clockwise, the user grips handle 11 and raises lifter plate 12 vertically upwardly in the direction of arrow 20. The user lifts the plate 12 slowly by hand until the spinning top 13 approaches the height of maximum negative gradient of the vertical component of the magnetic field. Now referring to FIG. 3, the top 13 has passed through the height of maximum negative gradient generally represented by dimension $h_1$, which causes it to lift or levitate upwardly in the direction of arrow 22 off the surface of lifter plate 12 to a new height $h_2$. As shown in FIG. 4, the lifter plate 12 may (but need not) be removed, e.g., in the direction shown by arrow 24. The spinning top 13 will remain levitating or floating above the geometric center G of base magnet 10 as shown in FIG. 4 until the rotation rate of the top 13 drops below that which will maintain the system stable.

Figure 3:
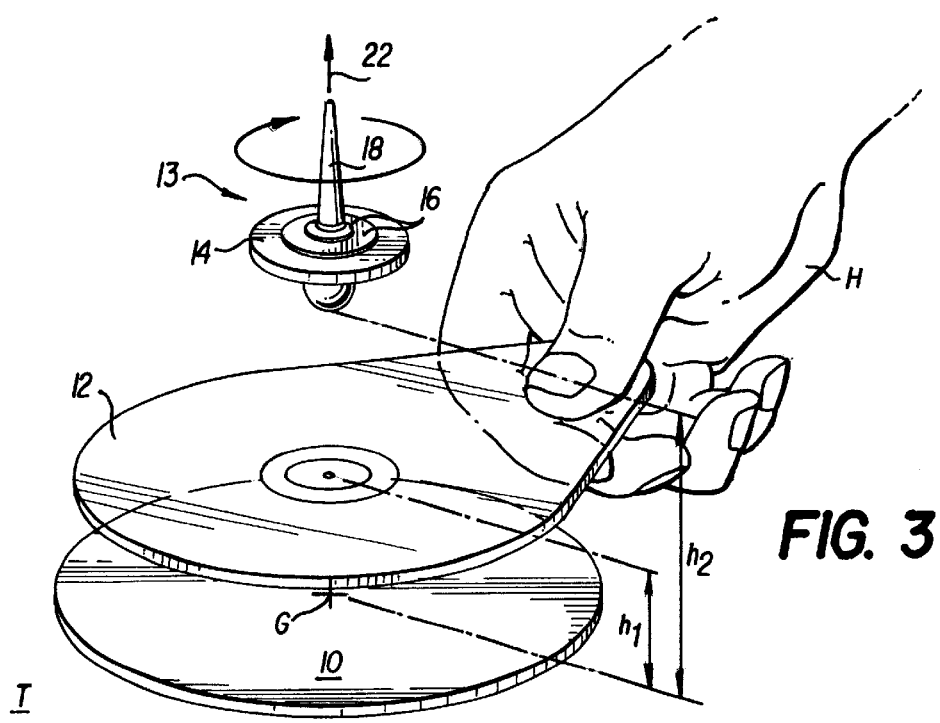
Figure 4:
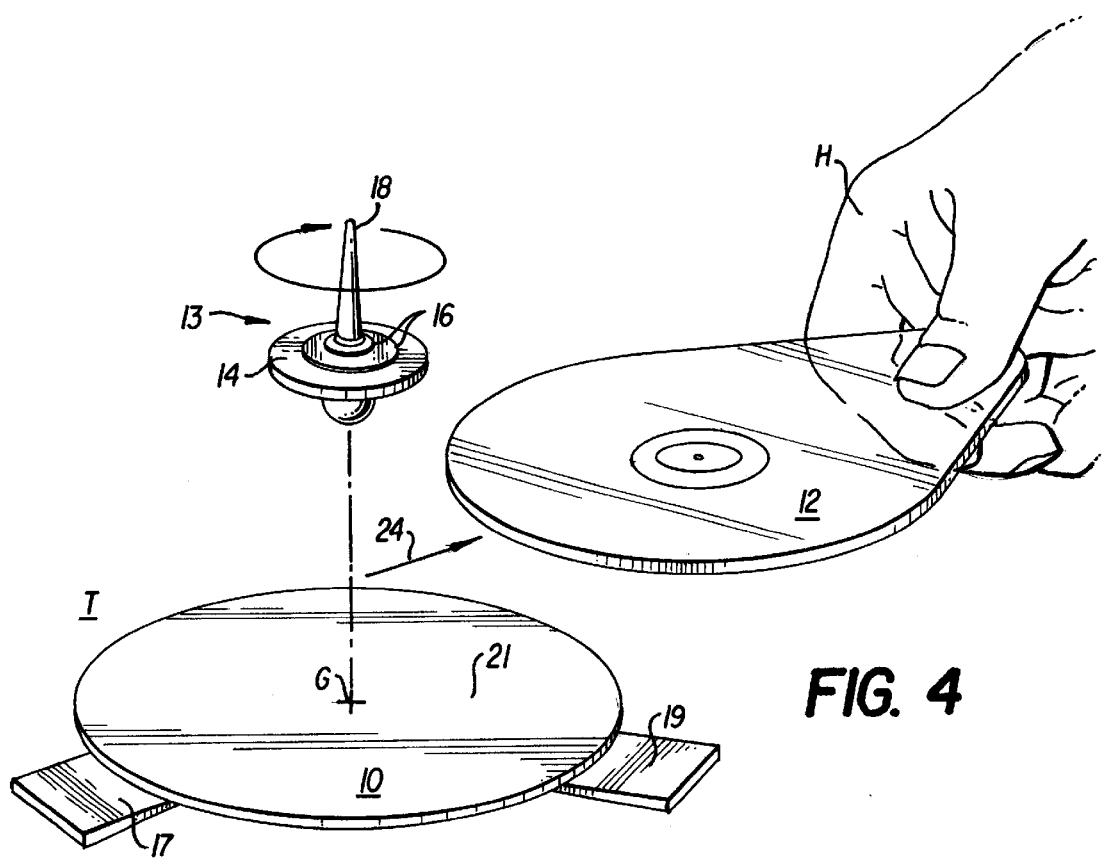

If the top 13 does not lift off the lifter plate 12 as shown in FIG. 3, it is too heavy and one or more washers 16 should be removed before the procedure is repeated. If the top 13 suddenly jumps off the lifter plate 12, becomes unstable and falls, the top is too light and one or more washers 16 (FIG. 1) should be added to the spindle 18 before the procedure is repeated. When the top is correctly weighted, it will rise gently off the lifter plate 12 as the peak negative gradient is approached and levitate. In actual operation, the top 13 will levitate or float for several minutes during which time it precesses, nutates gently up-and-down and from side-to-side until it slows and falls onto the base magnet.

Also shown in FIG. 4 are a pair of wedge-shaped shims 17, 19 which are used to adjust the position of the plane of the upper surface 21 of the base magnet 10. It is desirable that the surface T be substantially level so that the upper planar surface 21 of the base magnet 10 is also level, at least initially. It has been found, however, that even if the base magnet 10 is perfectly level, the spinning top 13 may quickly drift in one direction from its levitating position shown in FIG. 4 and fall. Should that occur, one of the shims 17, 19 is placed under the edge of the base magnet 10 along the direction the spinning top drifted so as to slightly raise the base magnet 10 at that point. The top 13 is again spun and levitated as shown in FIGS. 1–4 and if the top 13 still drifts in the same or a different direction, the shims 17, 19 are used to again slightly raise the edge of the base magnet along the direction of drift. By appropriate adjustment and positioning of the shims 17, 19 the spinning top can be made to levitate nearly directly above the geometric center G of the base magnet 10 for several minutes.

Figure 5:
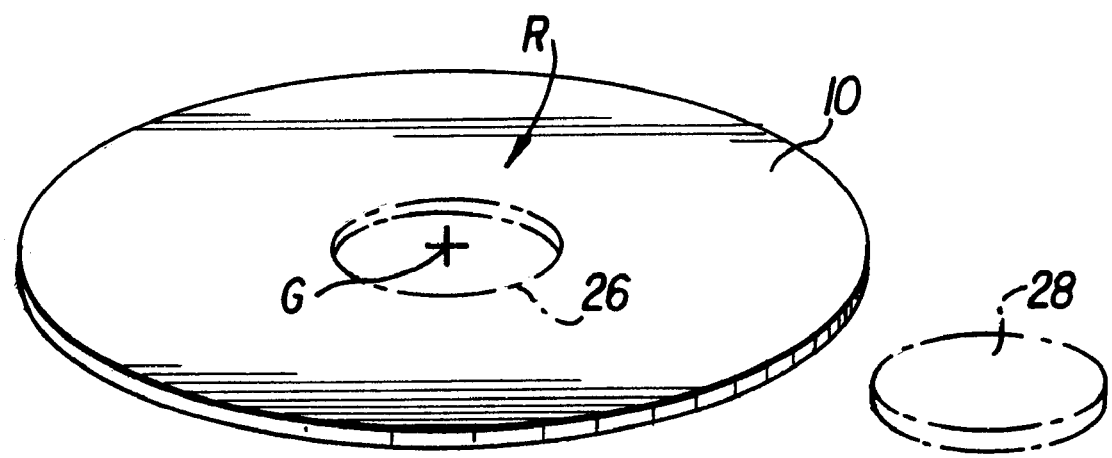
FIG. 5 is a perspective view of the base magnet shown in FIGS. 1–4 illustrating the weakened magnetic field in the central region thereof.

Referring now to FIG. 5, the base magnet 10 is shown with a central region R (shown in dashed lines) in which the magnetic field has been weakened in one of three ways. First, the weakened magnetic field in region R may be achieved by cutting a hole 26 in the geometric center G of the base magnet 10. Secondly, a magnetic disk 28 of opposite polarity, i.e., with its south (−) pole oriented upwardly over the geometric center G of the base magnet 10, may be mounted to region R by adhesive bonding or by any other suitable fixing means. Thirdly, a magnet, such as an electromagnet or permanent magnet (not shown), with a strong magnetic field may be positioned at region R and energized so that the magnetic field of the electromagnet or permanent magnet opposes that of base magnet 10 and effects a permanent partial demagnetization or weakening of the magnetic field in region R of magnet 10. It should be understood that while the region R is depicted in FIG. 5 as a circular region in the center of base magnet 10, the partial demagnetization is not necessarily centered in the base magnet and does not necessarily create a reduced field of circular shape.

This latter method is a preferred method since it involves no structural changes to the base magnet and is easily adjusted since the entire base magnet can be remagnetized over its entire surface and demagnetized in region R again and again. It is also possible to use this latter technique for adjusting or calibrating the magnetic field of the base magnet to achieve more stable levitation of the spinning top. Because of the inherent instability of opposed polarity magnetic systems, it is advantageous to adjust or calibrate the levitation device of the present invention to improve the ease of use of the device. While it is desirable that the use of the levitation device of the invention requires a certain degree of skill to achieve levitation, if the user becomes frustrated by an inability to operate the device, the marketability and success of the device can be adversely affected.

It has been found that by appropriate application of a demagnetized field in the central region of the base magnet, i.e., position of application and strength of the demagnetized field, both the height and stability of levitation can be increased. Because of the many variables involved, e.g., relative field strength of the magnets, mass of the spinning magnet, local magnetic fields, uniformity of magnetization, etc., calibration by partial demagnetization cannot be precisely controlled and calibration procedures are to some extent based on operator experience and empirical information.

Although certain presently preferred embodiments of the invention have been described herein, it will be apparent to those skilled in the art to which the invention pertains that variations and modifications of the described embodiment may be made without departing from the spirit and scope of the invention. Accordingly, it is intended that the invention be limited only to the extent required by the appended claims and the applicable rules of law.

What is claimed is:

1. A magnetic levitation device comprising:
   a first magnet made entirely of a magnetic material and having a first axis and a planar first surface, said first magnet being magnetized normal to said first surface and parallel to said first axis such that said first surface has a magnetic field with a first polar orientation, said magnetic field being weakened in a region of the first surface of the first magnet;
   a second magnet having a second axis and a second surface, said .second magnet being magnetized normal to said second surface and parallel to said second axis such that said second surface has a magnetic field with the same polar orientation as the magnetic field of the first surface of the first magnet; and
   means for transmitting rotation to said second magnet about the second axis such that when said second magnet is rotated about the second axis and disposed vertically above said first magnet with the first and second surfaces in confronting relation and the first and second axes in substantial alignment, said second magnet levitates over said first magnet free of any mechanical or nonmagnetic connection, restraint or support or any magnetic restraint or support other than the magnetic forces provided by said first and second magnets.

2. The levitation device of claim 1, wherein the magnetic field of the first magnet is nonuniform.

3. The levitation device of claim 1, wherein said region is a central region of said first magnet.

4. The levitation device of claim 1, wherein said first magnet has a circular periphery.

5. The levitation device of claim 1, wherein said first and second magnets comprise ceramic magnets.

6. The levitation device of claim 1, wherein said second magnet comprises a ring magnet having a central hole, the second surface being substantially planar, said rotation transmitting means comprising a spindle affixed in said central hole.

7. The levitation device of claim 1, including means for varying the weight of said second magnet to change the height above said first magnet at which said second magnet levitates.

8. The levitation device of claim 1, including a lifter plate made of a nonmagnetic material, said lifter plate being disposed between said first and second magnets when rotation is initially transmitted to said second magnet.

9. The levitation device of claim 1, wherein said first and second magnets are permanent magnets.

10. The levitation device of claim 1, including a bore disposed through the geometric center of said first magnet.

11. The levitation device of claim 1 including means for adjusting the position of the plane of the planar first surface of the first magnet.

12. A magnetic levitation device comprising:
   only one first magnet having a first axis and a planar first surface, said first magnet being magnetized normal to said first surface and parallel to said first axis such that said first surface has a magnetic field with a first polar orientation, said magnetic field being weakened in a region of the first surface;
   only one second magnet having a second axis and a second surface, said second magnet being magnetized normal to said second surface and parallel to said second axis such that said second surface has a magnetic field with the same polar orientation as the magnetic field of the first surface of the first magnet;
   means for transmitting rotation to said second magnet about the second axis whereby when said second magnet is rotated and disposed vertically above said first magnet with the first and second surfaces in confronting relation, said second magnet levitates over said first magnet free of any mechanical or nonmagnetic connection, restraint or support or any magnetic restraint or support other than the magnetic forces provided by said first and second magnets, said rotation transmitting means comprising a spindle affixed to said second magnet for manually rotating said second magnet about the second axis; and
   means for varying the weight of said second magnet to change the height above said first magnet at which said second magnet levitates, said weight varying means comprising at least one washer having a central opening adapted to fit over said spindle.

13. The levitation device of claim 12, wherein said washer and said spindle are made of a nonmagnetic material.

14. The levitation device of claim 12, wherein said spindle has an upper free end directed away from said first magnet when said second magnet is levitating thereover, said spindle being gradually tapered from a first diameter at its upper free end to a second larger diameter at a point above the second magnet, said washer being slidably and removably fitted onto the second magnet over said spindle with the free end of the spindle passing through the central opening of the washer.

15. A magnetic levitation device comprising:
a first magnet having a first axis and a planar first surface, said first magnet being magnetized normal to said first surface and parallel to said first axis such that said first surface has a magnetic field with a first polar orientation, said magnetic field being weakened in a region of the first surface;
a second magnet having a second axis and a second surface, said second magnet being magnetized normal to said second surface and parallel to said second axis such that said second surface has a magnetic field with the same polar orientation as the magnetic field of the first surface of the first magnet;
means for transmitting rotation to said second magnet about the second axis whereby when said second magnet is rotated and disposed vertically above said first magnet with the first and second surfaces in confronting relation, said second magnet levitates over said first magnet free of any mechanical or nonmagnetic connection, restraint or support or any magnetic restraint or support other than the magnetic forces provided by said first and second magnets; and
adjusting means comprising shims positionable beneath the first magnet for adjusting the position of the plane of the planar first surface of the first magnet.

16. The levitation device of claim 15, wherein said shims are wedge-shaped.

17. A method of levitating a device comprising the steps of:
supporting on a horizontal surface a first magnet having a first axis and a planar upper surface, said first magnet being magnetized normal to said planar upper surface and parallel to said first axis such that said planar upper surface has a magnetic field with a polar orientation;
locating an initial position of the planar upper surface of the first magnet relative to a horizontal plane;
placing a non-magnetic lifter plate over the planar upper surface of the first magnet;
placing a second magnet having a second axis and a lower surface on said lifter plate, said second magnet being magnetized normal to said lower surface and parallel to said second axis such that said lower surface has a magnetic field with the same polar orientation as the magnetic field of the planar upper surface of the first magnet;
substantially aligning the second axis of the second magnet with the first axis of the first magnet;
spinning the second magnet about the second axis while the second magnet is on the lifter plate;
raising the lifter plate vertically upwardly from the first magnet until said spinning second magnet levitates above the lifter plate and the planar upper surface of the first magnet;
observing a direction of drift of the second magnet from its levitating position above the first magnet; and
adjusting the position of the planar upper surface of the first magnet relative to the initial position by slightly raising the first magnet at a selected location along the direction of drift of the second spinning magnet.

18. The method of claim 17, wherein said spinning step comprises manually spinning said second magnet.

19. The method of claim 17, wherein said raising step comprises manually raising said lifter plate and including the step of manually removing said lifter plate from between the first and second magnets.

20. The method of claim 17, wherein said first magnet has a circular periphery and said upper surface is planar.

21. The method of claim 19, wherein said first magnet has a circular periphery and a central region and including the step of at least partially demagnetizing the central region of said first magnet.

22. The method of claim 17, wherein said adjusting step includes the step of shimming the first magnet at said selected location with a wedge-shaped shim.

23. The method of claim 17, wherein said second magnet has a spindle and including the steps of observing the height of levitation of said second magnet above said first magnet and adding a washer to the spindle of said second magnet to lower the height of levitation of the second magnet or removing a washer from the spindle of the second magnet to raise the height of levitation of the second magnet.

24. A magnetic levitation device comprising:
only one first magnet having a first axis and a planar first surface, said first magnet being magnetized normal to said first surface and parallel to said first axis such that said first surface has a magnetic field with a first polar orientation, said magnetic field being weakened in a region of the first surface of the first magnet;
only one second magnet having a second axis and a second surface, said second magnet being magnetized normal to said second surface and parallel to said second axis such that said second surface has a magnetic field with the same polar orientation as the magnetic field of the first surface of the first magnet; and
means for transmitting rotation to said second magnet about the second axis such that when said second magnet is rotated about the second axis and disposed vertically above said first magnet with the first and second surfaces in confronting relation and the first and second axes in substantial alignment, said second magnet levitates over said first magnet free of any mechanical or nonmagnetic connection, restraint or support or any magnetic restraint or support other than the magnetic forces provided by said first and second magnets.

25. A magnetic levitation device comprising:
only one first magnet made entirely of a magnetic material and having a first axis and a planar first surface, said first magnet being magnetized normal to said first surface and parallel to said first axis such that said first surface has a magnetic field with a first polar orientation, said magnetic field being weakened in a region of the first surface of the first magnet;
only one second magnet having a second axis and a second surface, said second magnet being magnetized normal to said second surface and parallel to said second axis such that said second surface has a magnetic field with the same polar orientation as the magnetic field of the first surface of the first magnet; and
a spindle connected to said second magnet along the second axis such that when said second magnet is rotated by the spindle about the second axis and disposed vertically above said first magnet with the first and second surfaces in confronting relation and said first and second axes in substantial alignment, said second magnet levitates over said first magnet free of any mechanical or nonmagnetic connection, restraint or support or any magnetic restraint or support other than the magnetic forces provided by said first and second magnets.

26. The levitation device of claim 25, wherein said second magnet comprises a ring magnet having a central hole, said spindle being affixed in said central hole.

* * * * *